US010270528B1

(12) United States Patent
Amacker et al.

(10) Patent No.: US 10,270,528 B1
(45) Date of Patent: Apr. 23, 2019

(54) SERIAL COMMUNICATION TO DEVICE THROUGH LIGHTING CONTROL

(71) Applicant: Google LLC, Mountain View, CA (US)

(72) Inventors: Matthew Amacker, Santa Clara, CA (US); Arshan Poursohi, Berkeley, CA (US); Daniel Aden, Redwood City, CA (US)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 15/199,786

(22) Filed: Jun. 30, 2016

(51) Int. Cl.
*H04B 10/00* (2013.01)
*H04B 10/116* (2013.01)
*H04B 10/114* (2013.01)
*H04W 4/02* (2018.01)
*H04B 10/54* (2013.01)

(52) U.S. Cl.
CPC ....... *H04B 10/116* (2013.01); *H04B 10/1141* (2013.01); *H04B 10/1143* (2013.01); *H04B 10/54* (2013.01); *H04W 4/02* (2013.01)

(58) Field of Classification Search
CPC .............. H04B 10/116; H04B 10/1149; H04B 10/1141; H04B 10/1143; H04B 10/54; H04B 10/1129; H04B 10/00; H04B 10/50; H04W 4/02; H05B 37/0272
USPC .......................... 398/172, 118, 127, 128, 130
See application file for complete search history.

(56) References Cited

U.S. PATENT DOCUMENTS

| 5,274,379 A | * | 12/1993 | Carbonneau | ....... H04B 10/2587 342/20 |
| 5,355,241 A | * | 10/1994 | Kelley | ...................... G01S 7/48 342/45 |
| 5,748,138 A | * | 5/1998 | Telle | ...................... G01S 13/78 342/13 |

(Continued)

FOREIGN PATENT DOCUMENTS

WO 2015075276 A1 5/2015

OTHER PUBLICATIONS

Liqun Li et al., "Epsilon: A Visible Light Based Positioning System", pp. 1-13.

(Continued)

*Primary Examiner* — Hibret A Woldekidan
(74) *Attorney, Agent, or Firm* — McDonnell Boehnen Hulbert & Berghoff LLP

(57) ABSTRACT

Systems are provided to emit, into an environment of interest, information in the form of modulated optical signals. These optical signals can be provided as illumination from a lighting fixture, display, or other source of environmental illumination. The optical signals can include codes or other information to facilitate location-specific operations of a device that is able to receive the optical signals. This can include receiving information about the location of a light emitter, security credentials or encryption keys, information about services that are available from building automation and/or conferencing systems, or other location-related information. A cellphone or other device receiving such optical signals could then operate to request information related to (Continued)

the received information, to submit commands to control a presentation or conferencing system, to communicate in a secure manner using a received cryptographic key, or to operate in some other way related to location-related information received via optical signals.

20 Claims, 5 Drawing Sheets

(56) References Cited

U.S. PATENT DOCUMENTS

| | | | | |
|---|---|---|---|---|
| 6,097,330 | A * | 8/2000 | Kiser | G01S 17/74 342/45 |
| 7,969,297 | B2 * | 6/2011 | Haartsen | G01S 1/70 340/531 |
| 8,027,591 | B2 * | 9/2011 | Maryfield | B82Y 20/00 398/107 |
| 8,457,498 | B2 * | 6/2013 | Stewart | G01S 3/786 398/108 |
| 8,510,033 | B2 * | 8/2013 | Park | G01S 1/70 398/43 |
| 8,861,976 | B2 * | 10/2014 | Roberts | H04L 1/0625 398/172 |
| 9,172,463 | B2 * | 10/2015 | Eber | H04B 10/1143 |
| 9,287,976 | B2 * | 3/2016 | Ganick | G01S 1/70 |
| 9,477,387 | B2 * | 10/2016 | Nordstrom | G06F 3/0481 |
| 9,600,983 | B1 * | 3/2017 | Lydecker | G08B 5/36 |
| 9,829,559 | B2 * | 11/2017 | Ganick | G01S 1/70 |
| 9,955,559 | B2 * | 4/2018 | Engelen | H05B 37/0245 |
| 10,129,955 | B2 * | 11/2018 | Rogers | G06T 7/80 |
| 2010/0322635 | A1 * | 12/2010 | Klinghult | H04B 10/11 398/132 |
| 2011/0313660 | A1 * | 12/2011 | Won | G01C 21/20 701/420 |
| 2013/0030747 | A1 * | 1/2013 | Ganick | G01C 21/206 702/95 |
| 2013/0183042 | A1 * | 7/2013 | Knapp | G08C 23/04 398/106 |
| 2014/0270794 | A1 * | 9/2014 | Rothenberg | H04B 10/116 398/118 |
| 2014/0314421 | A1 * | 10/2014 | Bae | G01C 21/00 398/128 |
| 2015/0280820 | A1 * | 10/2015 | Breuer | H04B 10/116 398/128 |
| 2016/0344476 | A1 * | 11/2016 | Pederson | G07C 9/00158 |
| 2017/0219684 | A1 * | 8/2017 | Jovicic | H04W 64/006 |

OTHER PUBLICATIONS

"Fujitsu transmits data about physical objects via LED light", Nov. 18, 2014, pp. 1-2.

* cited by examiner

SERIAL COMMUNICATION TO DEVICE THROUGH LIGHTING CONTROL

BACKGROUND

A variety of techniques exist to transfer information wirelessly between one or more devices or systems. These techniques can include transmitting modulated radio frequency or optical signals. The use of modulated optical signals to transfer information between devices may be especially suited to indoor environments, where sun glare and other noise sources may be minimized or controlled. Further, walls, doors, windows, and other elements of an indoor environment may act to block transmitted optical signals, limiting reception of the optical signals to devices located within the indoor environment. Wireless information transfer can include bidirectional communications (e.g., a bidirectional point-to-point link between two devices) or one-directional communications (e.g., a signal transmitter broadcasting wireless signals to one or more receivers).

SUMMARY

Some embodiments of the present disclosure provide a method including: (i) causing a light emitter to transmit an optical signal, wherein transmitting the optical signal includes transmitting a code by modulating an intensity of illumination provided by the light emitter; (ii) receiving a transmission from a device exposed to the provided illumination; (iii) determining that the received transmission was generated based on the code; and (iv) responsive to determining that the received transmission was generated based on the code, transmitting, to the device exposed to the provided illumination, information related to a location of the light emitter.

Some embodiments of the present disclosure provide a system including: (i) a transceiver; and (ii) a controller that is operably coupled to the transceiver. The controller includes a computing device that is programmed to: (a) cause a light emitter to transmit an optical signal, wherein transmitting the optical signal includes transmitting a code by modulating an intensity of illumination provided by the light emitter; (b) receive, using the transceiver, a transmission form a device exposed to the provided illumination; (c) determine that the received transmission was generated based on the code; and (d) responsive to determining that the received transmission was generated based on the code, transmit, using the transceiver, information related to the location of the light emitter to the device exposed to the provided information.

Some embodiments of the present disclosure provide a method including: (i) causing a light emitter to transmit an optical signal, wherein transmitting the optical signal includes transmitting a code by modulating an intensity of the illumination provided from the light emitter; (ii) causing a display to provide a first image; (iii) receiving a transmission from a device exposed to the provided illumination; (iv) determining that the received transmission was generated based on the code; and (v) responsive to determining that the received transmission was generated based on the code, causing the display to provide a second image.

These as well as other aspects, advantages, and alternatives, will become apparent to those of ordinary skill in the art by reading the following detailed description, with reference where appropriate to the accompanying drawings.

DETAILED DESCRIPTION

Figure 1:
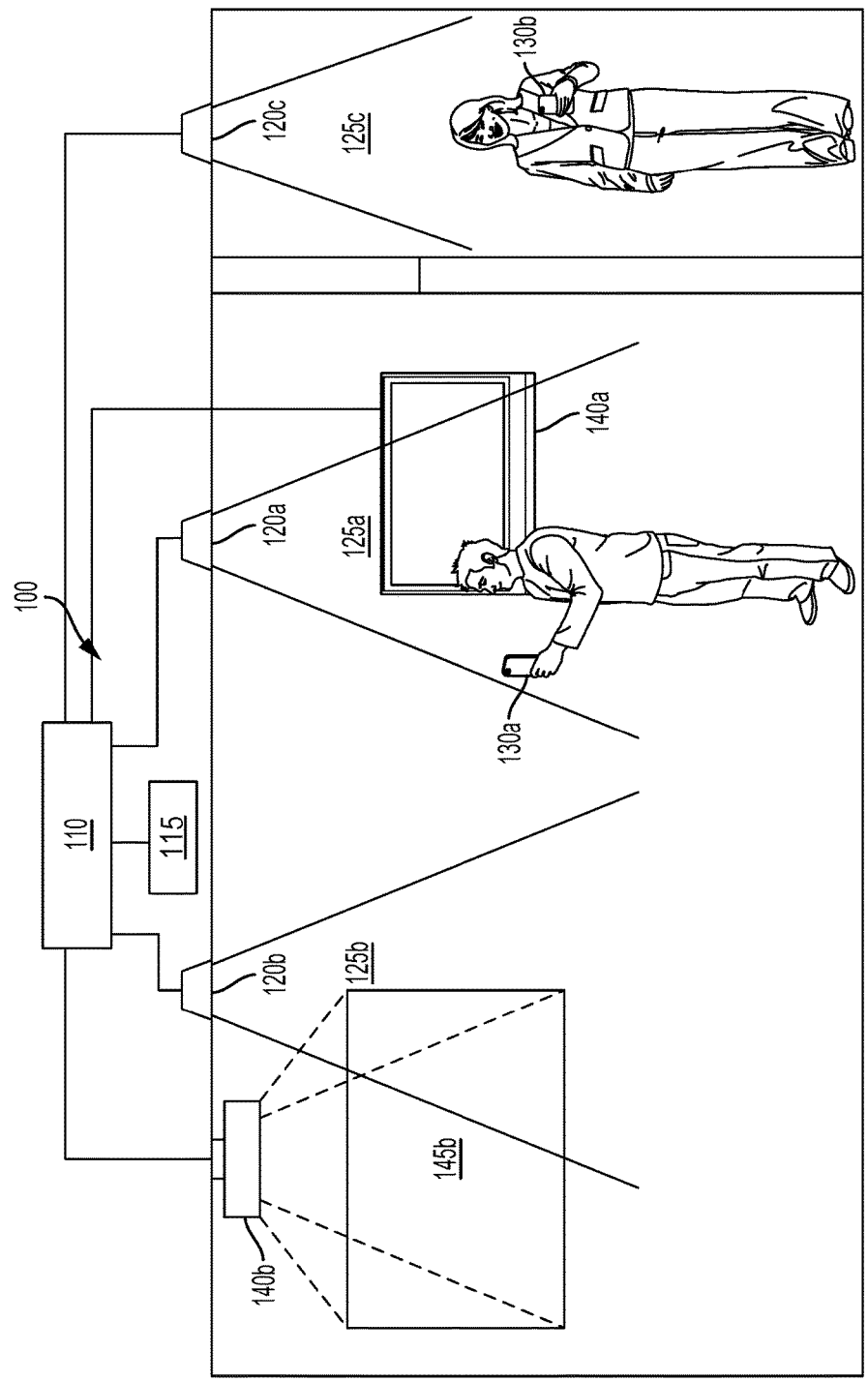
FIG. 1 is diagram of an example environment, portions of which are being provided with respective different optical signals from respective different light emitters.

In the following detailed description, reference is made to the accompanying figures, which form a part hereof. The illustrative embodiments described in the detailed description, figures, and claims are not meant to be limiting. Other embodiments may be utilized, and other changes may be made, without departing from the scope of the subject matter presented herein. Aspects of the present disclosure, as generally described herein, and illustrated in the figures, can be arranged, substituted, combined, separated, and designed in a wide variety of different configurations.

I. Overview

Wireless signals can be transmitted using a variety of different physical signals or phenomena, e.g., by transmitting acoustic signals through air or other media, by transmitting visible, infrared, radio frequency, or other types of electromagnetic waves, or by generating some other wireless energies. Optical signals provide advantages with respect to control of the region within which a transmitted optical signal may be received by a receiver or other device. The angle or other properties of emission of an optical signal can be tightly controlled. Further, a variety of materials that are substantially opaque to optical signals at one or more wavelengths (e.g., visible wavelengths, infrared wavelengths, ultraviolet wavelengths) are available and may be employed to block transmission of optical signals or otherwise control the extent of a region within which a transmitted optical signal may be detected. These properties make optical transmission promising for use in transmitting information that is relevant for a particular spatial location (e.g., geographical coordinates of a location; information about services provided in a room of a building) and/or that is advantageously restricted to a specified spatial location (e.g., cryptographic keys or other information that may be limited to individuals or devices that are present in a specified location).

Optical transmission could be accomplished in a variety of different ways. In some examples, the intensity of illumination provided by an overhead light, a wall sconce, or some other device for providing visible illumination to an environment could be modulated (e.g., according to an on-off keying modulation or some other modulation scheme) to transmit information, e.g., to transmit digital codes. The frequency and/or pattern used for this modulation could be sufficiently high (e.g., greater than 60 Hertz) that the modulation of the intensity of the provided illumination is not noticeable by the majority of human beings. Additionally or alternatively, the intensity of light that is outside of the visible light spectrum could be modulated to provide for optical transmission of information.

Such transmitted optical signals could provide codes or other information to a system or device (e.g., to a cellphone or laptop computer) to facilitate a variety of different applications. The transmitted information could be related to the location of a light emitter used to transmit the optical signal. For example, a light emitter could transmit, via such optical signals, codes indicative of the geographical location of the light emitter (e.g., latitude and longitude coordinates). The optically transmitted codes could provide an indication of services provided by a server or room automation service, e.g., an indication of commands that could be transmitted to a server or other controller to change the climate in a room, to control a videoconferencing or presentation system, or to control some other systems. Optically transmitted codes could indicate universal resource location strings, file system locations, or other information indicative of a file, an image, a stream, a map, a video, a program, or some other resource that a device could access. Optically transmitted codes could facilitate encryption or security, e.g., to provide sensitive information or security access to devices or systems that are exposed to a light emitter and thus in physical proximity to the light emitter and/or otherwise located within a potentially controlled, constrained spatial location. Codes transmitted optically using methods and systems described herein could be used to provide some other information or functionality.

A device that is exposed to illumination provided from such a light emitter (e.g., from a light emitter that is modulating an intensity of illumination provided by the light emitter in order to transmit codes or other information) could receive the codes or other information from the transmitted optical signals (e.g., by a process of demodulation) and perform some operations based on the received information. For example, such a device could responsively generate a transmission, based on a received code, to a server, controller, or other system that is causing the light emitter to transmit the optical signals or to some other system. Generating such a transmission could include emitting an optical signal, a radio frequency signal (e.g., a WiFi signal, a Bluetooth signal), a signal that is transmitted over the internet (e.g., via an LTE network or via some other networking equipment), or some other signal that can be received by the server, controller, or other system.

Such a system could then, in response to receiving the generated transmission, perform one or more actions. For example, the system could determine that the received transmission was generated based on an optically-transmitted code and provide some information or services based on the determination. This could include providing an indicated resource (e.g., an image, a file, a multimedia stream), indicating information about services provided by a videoconferencing or building automation system (e.g., providing indications of commands that could be used by a device to control the videoconferencing or building automation system), providing information about an ongoing presentation or other audiovisual event present proximate a light emitter (e.g., an indication of images, slides, or other information related to a presentation), or some other information. Additionally or alternatively, the system could provide a security credential, adjust a security database, generate an encrypted transmission or provide an encrypted communications channel, unlock a door or safe, change an image provided by a display, effect a change in a controlled room climate, or perform some other service or action in response to receiving a transmission that has been generated based on an optically-transmitted code.

Multiple different light emitters could operate to optically transmit, by modulating the intensities of the illumination provided by the different light emitters, respective different codes or other information to respective different areas or regions of an environment. Thus, devices located within the different areas or regions could receive different codes or other information. Differences in the provided codes could provide different services, information, or privileges to devices according to the location (e.g., according to whether a particular device is exposed to illumination from one or more light emitters). For example, a light emitter illuminating the head of a table could provide codes indicative of instructions, keys, or other information that could be used to control the operation of a presentation system (e.g., to change a slide of a presentation, to select a participant in a videoconference) while a light emitter illuminating another location of the table could provide codes indicative of information related to the presentation system (e.g., a presentation image, biographical information of a speaker).

Further, a light emitter as described herein could be caused to optically transmit different codes or other information at different points in time. For example, a plurality of different codes indicative of respective different cryptographic keys could be optically transmitted at respective different points in time to increase the security of communication between a device exposed to the optical signals and a system that is operating the light emitter to emit the optical signals. In another example, a presentation slide, indication of a resource, or other information indicated by an optically-transmitted code could be changed over time (e.g., in time with changes in a slide or other image provided by a display of a presentation system).

It should be understood that the above embodiments, and other embodiments described herein, are provided for explanatory purposes, and are not intended to be limiting.

II. Example Transmission of Location-Related Information in an Environment

A variety of systems and methods may be employed to provide, from one or more light emitters, codes or other information via transmitted optical signals. Such optical signals could be transmitted to a portion of an environment of interest (e.g., to an area of a room, to a region in front of a display, to some other volume proximate the light emitter(s)) by modulating the intensity of illumination provided by one or more light emitters, e.g., by modulating an intensity of room lighting provided by an overhead light, a lamp, a wall sconce, or by some other device for providing visible-light illumination to portions of an environment. The transmitted codes or other information could be related to the location of the light emitter that is operated to transmit the codes, e.g., geographic coordinates of the light emitter, information and/or commands relating to videoconferencing or other systems present in a room, cryptographic and/or security keys related to use of systems related to a location (e.g., door locks, local network access), images or other information related to a presentation occurring in a room, or some other information or services related to a particular location.

FIG. 1 illustrates environments that could be provided with illumination from one or more light emitters. Further, particular locations or regions of the environment could be provided with respective optical signals transmitted via modulation of the intensity of the illumination to the particular locations or regions. The environments shown in FIG. 1 include first and second rooms. First and second locations (illustrated by first 125a and second 125b light cones) of the first room are being provided with illumination from respective first 120a and second 120b light emitters. A third location (illustrated by third light cone 125c) in a second room is being provided with illumination from a third light emitter 120c. A first device 130a, a first display 140a, and a second display 140b (projecting a projected image 145b onto a wall or screen) are located in the first room and a second device 130b is located in the second room. The first device 130a is exposed to the illumination 125a provided by the first light emitter 120a and the second device 130b is exposed to illumination 125c provided by the third light emitter 120c.

FIG. 1 illustrates a system 100 that includes a controller 110 and a transceiver 115. The controller 100 is configured to operate the transceiver 115, light emitters 120a, 120b, 120c, displays 140a, 140b, and/or other devices or systems (not shown). The system 100 and/or elements thereof (e.g., the controller 110) could be configured as a server or some other device or system and could be located proximate to the environment illuminated by the one or more of the light emitters 120a, 120b, 120c or could be located at a distance from the light emitters and could communicate with the light emitters and/or other devices (e.g., 130a, 130b). In some examples, the operations of the system 100 could be provided by a program or application running on a server or in a cloud computing system. Such systems could be configured to execute a computer-readable medium that stores instructions for controlling light emitters, communicating with devices exposed to light from such light emitters, or for performing some other operations described herein.

The system 100 could include the light emitter 120a, 120b, 120c, displays 140a, 140b, and/or other devices or systems. In such an example, the controller 110 could control the other elements of the system 100 via buses or interconnects of the system, via wireless or wired transmission, via communications using network equipment (e.g., a router, the internet), or via some other system(s). Additionally or alternatively, one or more light emitters or other elements controlled by the system could be considered separate from the system and could be operated by the controller, e.g., via wired or wireless transmissions generated using the transceiver, via a router, via the internet. In some examples, one or more of the light emitters 120a, 120b, 120c could comprise a programmable illumination source that can be instructed (e.g., via a Bluetooth or WiFi signal or via some other wired or wireless transmission) to emit a specified code or other information by modulating an intensity of illumination provided by the light emitter(s) at one or more wavelengths.

The system 100 could operate the display(s) 140a, 140b to provide images, video, or other information to individuals or systems in the environment. In some examples, the intensity of light emitted by one or both of the displays 140a, 140b could be modulated to transmit optical signals encoding codes or other information that could be received by a device exposed to such light.

The light emitters 120a, 120b, 120c could be caused (e.g., by direct operation by the controller 110, by transmission of instructions from the controller 110, or by some other operation(s)) to transmit optical signals to respective areas of the environment by modulating the intensity of the illumination provided by the light emitters. These transmitted optical signals could represent codes, timing information, analog values, or some other information. Further devices exposed to the illumination (e.g., 130a, 130b) could operate to receive such transmitted optical signals and to perform some operations based on the content of the signals (e.g., based on one or more codes present in the optical signals) and/or in response to receiving the signals. Such operations could include presenting an indication of the received codes to a user (e.g., displaying an image represented by codes or other information present in a received optical signal), modifying programming of the device (e.g., receiving a programming update via the optical signals), communicating with the controller 110 or with some other system (e.g., to request a file or other resource indicated by codes present in the optical signal), or performing some other action.

Codes or other information present in the transmitted optical signal(s) could represent a variety of information, e.g., advertisements, weather alerts, location information, files, images, room or building maps, information about services or systems present in a building, information describing operations for commanding or otherwise interacting with a system (e.g., with the system 100 of FIG. 1), or some other information. For example, a ceiling light or other light emitter in a coffee shop, restaurant, home, or other location could optically transmit a code indicative of a WiFi password or key of a wireless network present at the location.

In some examples, codes present in the transmitted optical signal(s) could facilitate some further interaction with a light emitter and/or with a system that is causing the light emitter to transmit the optical signals. For example, the first device 130a could receive a code provided, as part of an optical signal transmitted from the first light emitter 120a, by the controller 110. The first device 130a could then generate a transmission (e.g., an optical transmission, a radio frequency transmission, a WiFi transmission, a Bluetooth transmission, a transmission via a router or the internet) based on the code. The generated transmission could be received by the controller 100 (e.g., using the transceiver 115) to facilitate some further operations of the system 100.

Such a device generating a transmission based on a received code could include the device generating the contents of the transmission based on the identity of the code. For example, the generated transmission could include a copy of the code (e.g., the transmission could echo a portion of the transmitted optical signal that includes the code). The transmission could be encrypted according to the received code (e.g., the code could be used as a cryptographic key). The received code could be indicative of a file, image, stream, video, API, command, program, link, or other resource (e.g., the code could be indicative of a URL) and generating a transmission based on the code could include generating a request for the indicated resource. Additionally or alternatively, a device generating a transmission based on a received code could include the device generating the transmission in response to reception of the code. For example, the received code could be indicative of an instruction to generate the transmission.

The system 100 (e.g., the controller) could perform some operations based on and/or in response to receiving, from a device (e.g., from 130a or 130b), such a transmission. For example, the transmission from the device could include a request for a resource (e.g., an image, a presentation slide, a videoconference stream) and, in response, the system could transmit the resource to the device. The system 100 could determine whether the received transmission was generated based on an optically-transmitted code and further operations could be based on the results of such a determination, e.g., to provide security credentials to and/or execute commands received from only those devices that have received the code.

Determining whether a received transmission was generated based on an optically-transmitted code could include determining whether the transmission includes the code, determining whether the transmission includes information encrypted using the code, determining that a request for a resource indicated by the code is present in the transmission, or performing some other determination based on the contents of the received transmission. Additionally or alternatively, the timing of the received transmission (e.g., within a specified duration after optically transmitting the code) and/or the fact that a transmission was received at all (e.g., in situations wherein it is rare that the system 100 receives such transmissions from devices that have not optically received the code) could be used to determine that a transmission was generated based on an optically-transmitted code.

In some applications, the system 100 could operate to provide, via transmitted optical signals, location-specific information without attempting to restrict access to such information and/or access to resources or services indicated by such information. For example, ceiling light or other light emitter(s) of a coffee shop could optically transmit a code that could be used to download a music file for free and/or that could indicate a URL or other information useful for accessing the music file. In such applications, the system 100 could provide an indicated resource, music file, or other information or services, responsive to receiving a transmission indicative of such, without determining that the received transmission was generated based on a transmitted optical code.

Additionally or alternatively, the system 100 may use a procedure to determine whether a received transmission was generated based on an optically-transmitted code that may incorrectly make such a determination. This could allow devices not exposed to the optically-transmitted code to receive information and/or access or control service of the system 100. For example, a device that is not exposed to illumination from the coffee shop could transmit a request for a music file that is indicated by a code optically-transmitted in the coffee shop illumination. The system could then determine that the received transmission was generated based on the code based on the transmission including a request for the music file. Based on this incorrect determination, the system 100 could then provide the music file to the device that is not exposed to illumination from the coffee shop.

The system 100 could transmit information (e.g., using the transceiver 115) to a device in response to determining that a transmission received from the device was generated based on a code optically transmitted by a light emitter to the device. The transmitted information could be related to the location of the light emitter. Information related to the location of a light emitter could include an indication of the location of the light emitter, information about devices or systems that are located proximate to the light emitter, information about the environment of the light emitter, files or other resources that have been associated with the location of the light emitter (e.g., via metadata or file permissions), images or other information related to a presentation or other audiovisual event being presented proximate the light emitter, an advertisement that has been associated with the location of the light emitter (e.g., an advertisement being presented on a display that is proximate to and/or that comprises the light emitter), or some other information related to the location of the light emitter.

Information related to the location of a light emitter could include information related to servers, audiovisual equipment (e.g., displays), teleconferencing equipment, climate controls, or other systems that operate in proximity to or otherwise affect the environment of the light emitter. Such information could include images, slides, supplemental information, biographical information, hyperlinks, links to audio or video recordings of a presentation or teleconference, or other information related to a presentation, video-conference, advertisement, or other information being presented proximate to the light emitter (e.g., by one or both of the displays 140a, 140b). For example, the controller 110 could cause the display 140a to provide an image (e.g., a slide of a presentation, an advertisement) and, in response to receiving a transmission from the first device 130a and/or determining that such a transmission was generated based on an optically-transmitted code, the controller 110 could transmit, to the first device 130a, an indication of the provided image. Such an indication could include a raster, vector, or other representation of the image, caption or metadata related to the image, additional annotations or hyperlinks, or some other information indicative of the image provided on the display and/or related to such an image.

Information related to systems that operate in proximity to or otherwise affect the environment of the light emitter could include information indicative of services or capabilities of such systems and/or commands that could be used (e.g., by transmitting such commands to the server 110) to control or otherwise affect the operation of such systems. Such information could include a listing of the properties of communications devices or connections (e.g., a number or properties of ISDN or POTS lines, a bandwidth of an internet connection), properties of audiovisual inputs or outputs (e.g., a number, relative location, orientation, or other properties of projectors, displays, speakers, microphones, and/or cameras), properties of climate control systems (e.g., automated blinds, HVAC systems), information about properties or contents of local data storage (e.g., a listing of videos, slideshows, presentations, or other information that may be locally available), contact or biographical information related to a conference room within which the light emitter is located (e.g., an email username, Google+ account, phone number, or other contact information for individuals scheduled to attend a meeting in the conference room or otherwise associated with the conference room), or some other information related to systems located and/or configured to provide services proximate to the light emitter.

Information about such systems could include information related to operating such systems. This information could include descriptions of commands, APIs, control protocols, operational states and/or control protocol states, user-readable software-defined control panels or user interfaces, or other information about controlling or otherwise affecting the operation of such systems and/or retrieving information about the ongoing operations or status of such systems. For example, the controller 110 could, in response to receiving a transmission from the first device 130a and/or determining that such a transmission was generated based on an optically-transmitted code, transmit, to the first device 130a, an indication of a set of one or more commands. The first device 130a could then generate a further transmission to the controller 110 and the controller 110 could, responsive to determining that the further transmission includes an indication of a command from the set of commands, perform one or more operations corresponding to the indicated command.

Commands could include commands to increase or decrease a level of illumination in the room (e.g., to increase or decrease a mean intensity of illumination provided by one or more of the light emitters 120a, 120b, 120c, to operate blinds over a window of the first room), to set temperature of a climate control system, to control an ongoing presentation (e.g., to advance a slide show), to initiate or end a videoconference with one or more individuals, to select one or more individuals from a list of individuals to invite to a videoconference, or to perform some other action. In an example, the controller 110 could operate the display 140a to provide a first image and could transmit to the first device 130a a set of commands including a command to change the provided image (e.g., to increment a slide of a presentation, to display a particular image, to add an overlay to the original image, or to display a random image). The first device 130a could then transmit, to the controller 110, the command to change the provided image and, in response, the controller 110 could cause the display 140b to provide a second image.

The first device 140a (or some other device that receives an indication of a set of commands) could operate to transmit one or more of the set of commands responsive to receiving the indication of the set of commands. For examples, the first device 140a could operate to transmit indications of one or more commands to conform the operation or configuration of the system 100 to a set of user preferences stored on the first device 130a, to begin playback of an audio file (e.g., an audio file that had been playing previously in another room that a user of the device had left), to upload and/or select a presentation file, to sync biographical or contact info with a database of the first device 130a or to perform some other operations. Additionally or alternatively, the first device 130a could provide a user interface to a user (e.g., by operating a touchscreen display of the first device 130a) with controls corresponding to the indicated set of commands. The first device 130a could then transmit an indication of a particular one of the set of commands in response to the user selecting the particular command.

Communications of a device exposed to illumination providing optically-transmitted codes could be secured using such codes. For example, a device could receive one or more codes via optical transmission and could use the codes to encrypt transmissions to and/or from another system. For example, the first device 130a could use one or more optically-transmitted codes to encrypt transmissions to the controller 110 (e.g., transmission received using the transceiver 115). Additionally or alternatively, the controller 110 could encrypt transmissions to the first device 130a or to some other device(s) according to a code optically transmitted via one or more light sources. To increase the security of such transmissions and/or to restrict such encrypted communication to systems or devices that remain in a particular location (e.g., that continue to be exposed to illumination provided by one or more light sources), the controller 110 could cause the light emitter(s) 120a, 120b, 120c to optically transmit further codes during respective different periods of time and to engage in encrypted communications during the different periods of time according to respective different codes.

In an example, an optically-transmitted code (e.g., a code transmitted via one or more of the light emitters 120a, 120b, 120c) could indicate a cryptographic key, a set of commands, or some other information used to secure communications or other interactions with a server or other system (e.g., with the controller 110). The content of the optically-transmitted code (e.g., the identity of an indicated cryptographic key) could change at a regular rate (e.g., every five seconds). Thus, devices that are exposed to illumination provided to transmit the codes (e.g., a cellphone or tablet computer located in the first room of FIG. 1) could receive optically-transmitted codes and use the codes to securely communicate or otherwise interact with a server or other system. However, if such a device were to leave the area where the illumination is being provided (e.g., by leaving the first room of FIG. 1), the device would no longer be receiving new optically-transmitted codes and so would no longer be able to communicate or otherwise interact with the server or other system. Thus, the systems and procedures described herein could be used to facilitate location-limited provision of security keys or other privileges.

Multiple different codes could be transmitted, as optical signals transmitted by modulating the intensity of illumination provide by one or more light emitters, at different points in time to facilitate a variety of applications. As noted above, the different codes could provide different cryptographic keys to improve the security of communications encrypted according to the codes and/or to prevent devices that are not exposed to the optical signals from engaging in and/or eavesdropping on such encrypted communications. Different codes could be provided at different points in time to provide updates regarding the status of a videoconferencing or presentation system, different advertisements, or some other updated or otherwise changed information. For example, a first code, optically transmitted at a first point in time, could indicate a first image or other information being displayed at the first point in time. At a second point in time, the displayed image could change to a second image and a second code, indicative of the second image, could be optically transmitted.

Further, a single system (e.g., 100) could optically transmit from different light emitters (e.g., 120a, 120b, 120c) respective different codes. These different codes could provide different information, e.g., different information related to respective different locations of the different light emitters. For example, the first light emitter 120a could be operated to optically transmit a first code related to information displayed on the first display 140a while the second light emitter 120b could be operated to optically transmit a second code related to information displayed by the second display 140b. In another example, the first 120a and second 120b light emitters could optically transmit code(s) related to systems or services available in the first room while the third light emitter 120c could optically transmit a code related to systems or services available in the second room. In yet another example, a light emitter located near a podium in a room could optically transmit code(s) relating to the control of a projector or other conferencing systems (e.g., codes indicative of commands to upload images or other presentation files, to adjust the mean light level in a room, to advance slides of a presentation) while light emitters located in other locations of the room could optically transmit code(s) related to slides being displayed by a projector, biographical information about a speaker, supplemental information or hyperlinks related to a presentation, or some other information.

III. Example Electronics of a Light Emitter System

Figure 2:
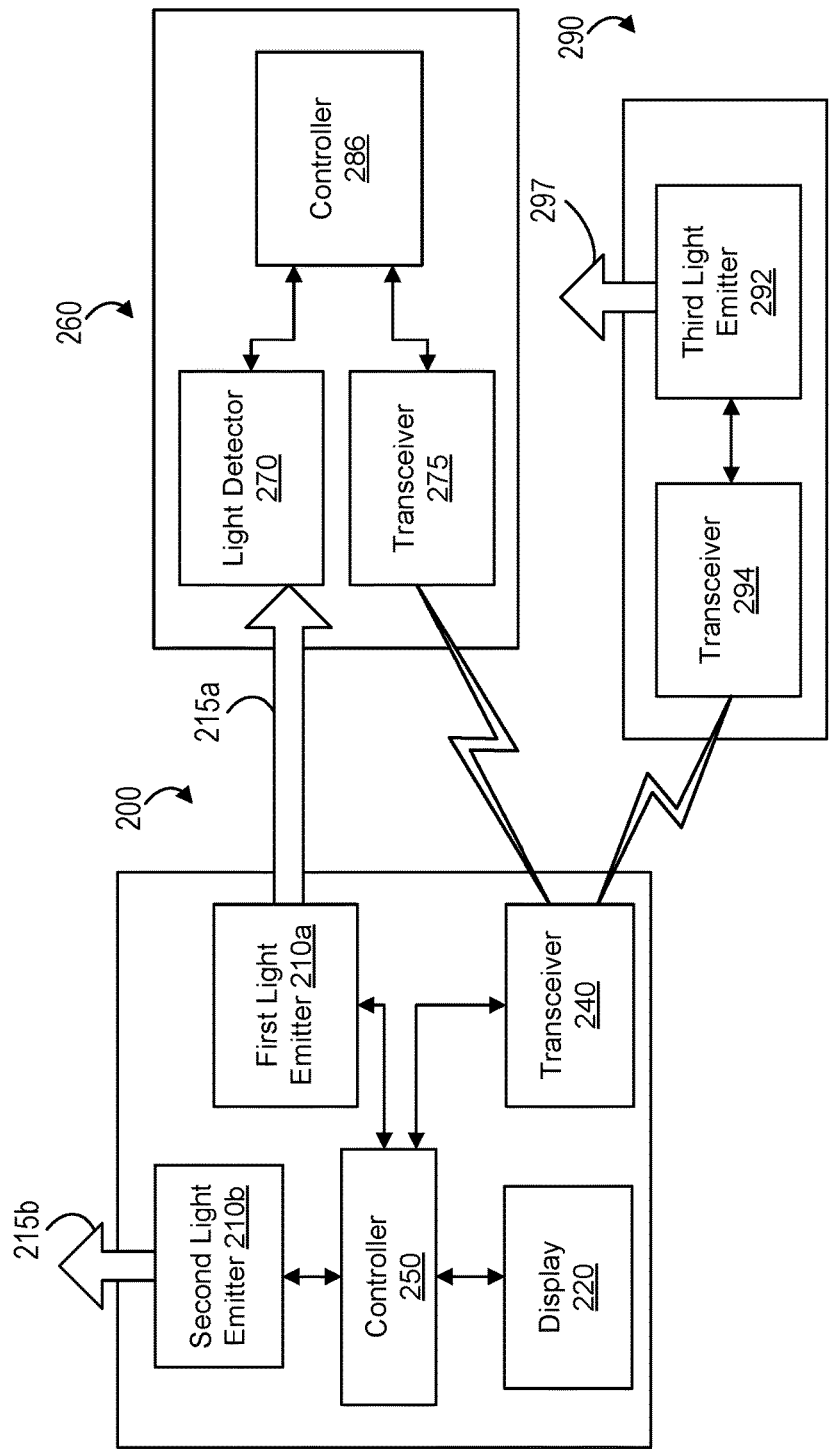
FIG. 2 is a block diagram of an example system that includes a multiple light emitters and a transceiver.

FIG. 2 is a block diagram that includes a system 200 for transmitting, via modulation of the intensity of illumination provided by one or more light emitters, codes or other information to device(s) exposed to the illumination and for performing additional operations related to the optically-transmitted codes. FIG. 2 further illustrates a remote device 290 that may receive commands or other transmissions from the system 200 and, in response to such transmissions, modulate the intensity of illumination provided by a third light emitter 292 of the remote device 290 to transmit codes or other information to device(s) exposed to the illumination provided by the remote device 290. FIG. 2 also illustrates a receiver device 260 that is exposed to illumination 215a provided by the first light emitter 210a.

The system 200 includes first 210a and second 210b light emitters that are configured to provide illumination to respective environments (e.g., to respective areas of the same room and/or the same building). The light emitters 210a, 210b are configured to transmit optical signals via the provided illumination 215a, 215b by modulating the intensity of the illumination. The transmitted optical signals can include one or more codes that can be used as described elsewhere herein. The system 200 further includes a controller 250, a transceiver 240 (e.g., an Ethernet interface, a WiFi radio, a Bluetooth radio, a cellular data radio) and a display 220 (e.g., a projector, a monitor).

The system 200 could be a server, a desktop computer, a videoconferencing or presentation system, or some other type of system. Elements of the system 200 could be located proximate to each other (e.g., the light emitters 210a, 210b, controller 250, display 220, and transceiver 240 could be located in a single room and connected via wired or wireless interconnects). Additionally or alternatively, one or more elements of the system 200 could be located at a distance from each other. For example, the controller 250 could be implemented as a server or as an application or process being executed in a cloud computing system and the controller 250 could be in communication with other elements of the system via Ethernet, a router, the internet, or some other wired or wireless interconnects.

Note that, while the system 200 is illustrated as including a display 220 and two light emitters 210a, 210b, a system as described herein could include more or fewer of the illustrated elements and/or could include further elements not shown in FIG. 2. For example, the system 200 could include further light emitters. Alternatively, the system 200 could include no light emitters and could instead operate to cause one or more light emitters of other devices or systems (e.g., of remote device(s) 290) to optically transmit one or more codes or other information by modulating the intensity of illumination provided to one or more locations in an environment. Causing a light emitter to emit such optical signals could include transmitting instructions to the light emitter to emit the optical signals, transmitting another signal (e.g., a radio frequency signal or another optical signals that could be received by the transceiver 294 and transduced into an optical signal emitted from the third light emitter 292) to the light emitter, or performing some other operations to cause the light emitter to optically transmit one or more codes or other information.

The system 200 is configured to transmit, via modulation of the intensity of illumination provided by one or more light emitters of the system (e.g., 210a, 210b) and of other systems in communication with the system 200 (e.g., the third light emitter 292 of the remote device 290), codes or other information to device(s) exposed to the illumination and to engage in further communication or other interactions with such devices. These interactions can include receiving, from a device exposed to such illumination (e.g., from device 260) transmissions generated based on codes optically transmitted via the illumination. The system 200 may then communicate further with the device or may perform some other operations (e.g., to change or control the operation of a videoconferencing system, to change a security status of the device in a database, to unlock a door). These further communications or other actions may be performed in response to a determination, by the system 200 (e.g., by the controller 250) that the transmission received from the device was generated based on one or more codes optically transmitted by the system 200.

The system 200 could operate to optically transmit different or the same codes or other information from different light emitters that are under control of the system 200. For example, the system 200 could operate the light emitters 210a, 210b to provide different codes such that the system 200 could determine, based on transmission(s) received from a device exposed to the illumination provided by one or both of the light emitters 210a, 210b, where the device is located relative to the light emitters 210a, 210. The system 200 could then, based on such a determination, provide information to the device related to the location of the light emitter(s) from which the device is receiving illumination. Additionally or alternatively, the system 200 could operate to optically transmit different codes at different points in time, e.g., to improve the security of communications encrypted based on the codes, to reflect a change in information about a location (e.g., a change in status of a conferencing system), to provide an indication of a newly displayed slide, or according to some other application.

The controller 250 of the system 200 is configured to operate the light emitters 210a, 210b, transceiver 240, and other elements of the system 200 (e.g., the display 220) and/or of other systems in communication with the system 200 (e.g., the third light emitter 292 of the remote device 290) to provide the some or all of the operations described herein. The controller 250 could include one or more microcontrollers, servers, cloud computing systems, or other components configured to perform operations described herein. The controller 250 could include elements configured to perform such actions based on program instructions or other information contained within a computer readable medium, e.g., to cause a light emitter to optically transmit a code, to receive a transmission from a device that has received such an optical transmission, to determine whether a received transmission was generated based on an optically transmitted code, to transmit some information (e.g., information related to a location of a light emitter) to the device, or to perform some other actions.

The remote device 290 that includes a third light emitter 292 and a transceiver 294 configured to receive instructions from the controller 250 of the system 200 via the transceiver 240 of the system 200. The third light emitter 292 is configured to transmit optical signals (e.g., codes or other information) by modulating the intensity of illumination 297 provided by the third light emitter 292. The remote device 290 could be configured as a drop-in element designed to mount into a ceiling fixture, wall-mounted fixture, lamp, or other standard lighting fixture and to communicate in a wired or wireless fashion with the system 200. Such communications could include indications of codes that the remote device 290 could optically transmit using the third light emitter 292.

The receiver device 260 is exposed to illumination 215a provided by the first light emitter 210a. The receiver device 260 includes a controller 286 and a light detector 270 configured to detect optical signals in the illumination emitted from one or more light emitters (e.g., 210a, 210b, 292) to which the receiver device 260 is exposed. The receiver device 260 further includes a transceiver 275 configured to facilitate communication with the system 200 via the transceiver 240 of the system 200. The receiver device 260 could take the form of and/or form a part of a cell phone, a badge, a watch, a key fob, a pen, an element of jewelry or clothing, or some other device that may be exposed to illumination provided by one or more light emitters.

The controller 286 of the receiver device 260 could include a variety of elements configured to operate the light detector 270 to detect the intensity or other properties of illumination to which the receiver device 260 is exposed (e.g., illumination from the first light emitter 215a) and to determine codes or other optically-transmitted information from the detected intensity. For example, the controller 286 could include logic gates, arithmetic logic units, microprocessors, registers, digital oscillators, counters, logical buses, amplifiers, analog-to-digital converters (ADCs), mixers, analog oscillators, buffers, or some other component or components. The controller 286 could be configured to perform some actions based on such detected codes. For example, the controller 286 could be configured to provide a user interface based on a set of commands indicated by received codes, to generate a transmission, using the transceiver 275 of the receiver device 260, based on a received code, and/or to perform some other operations. The controller 286 could be configured to perform operations described herein based on instructions stored in a computer readable medium (e.g., instructions stored in a memory of the receiver device 260). In some examples, the instructions could take the form of an application or API that could be executed by an operating system of the receiver device 260.

The light detector 520 could include a photodiode, a phototransistor, a photoresistive element, a camera, or some other components configured to output a voltage, a current, or some other electrical signal related to the intensity or other properties of illumination to which the receiver device 260 is exposed. The controller 286 could include amplifiers, transimpedance amplifiers, filters, buffers, voltage references, ADCs, or other components configured to operate the light detector 270 to detect the intensity of illumination received from the environment (e.g., from light emitters of or under the control of the system 200).

It is noted that the block diagram shown in FIG. 2 is described in connection with functional modules for convenience in description. However, embodiments of the system 200, receiver device 260, and/or remote device 290 can be arranged with one or more of the functional modules ("subsystems") implemented in a single integrated circuit (e.g., an integrated circuit that includes a light detector and circuitry for detecting an intensity of light received via the light detector, an integrated circuit that includes a controller and LED-driving circuitry of a light emitter), multiple integrated circuits or electronic assemblies (e.g., printed circuits boards with electronic components disposed thereon), or according to some other consideration.

IV. Example Methods

Figure 3:
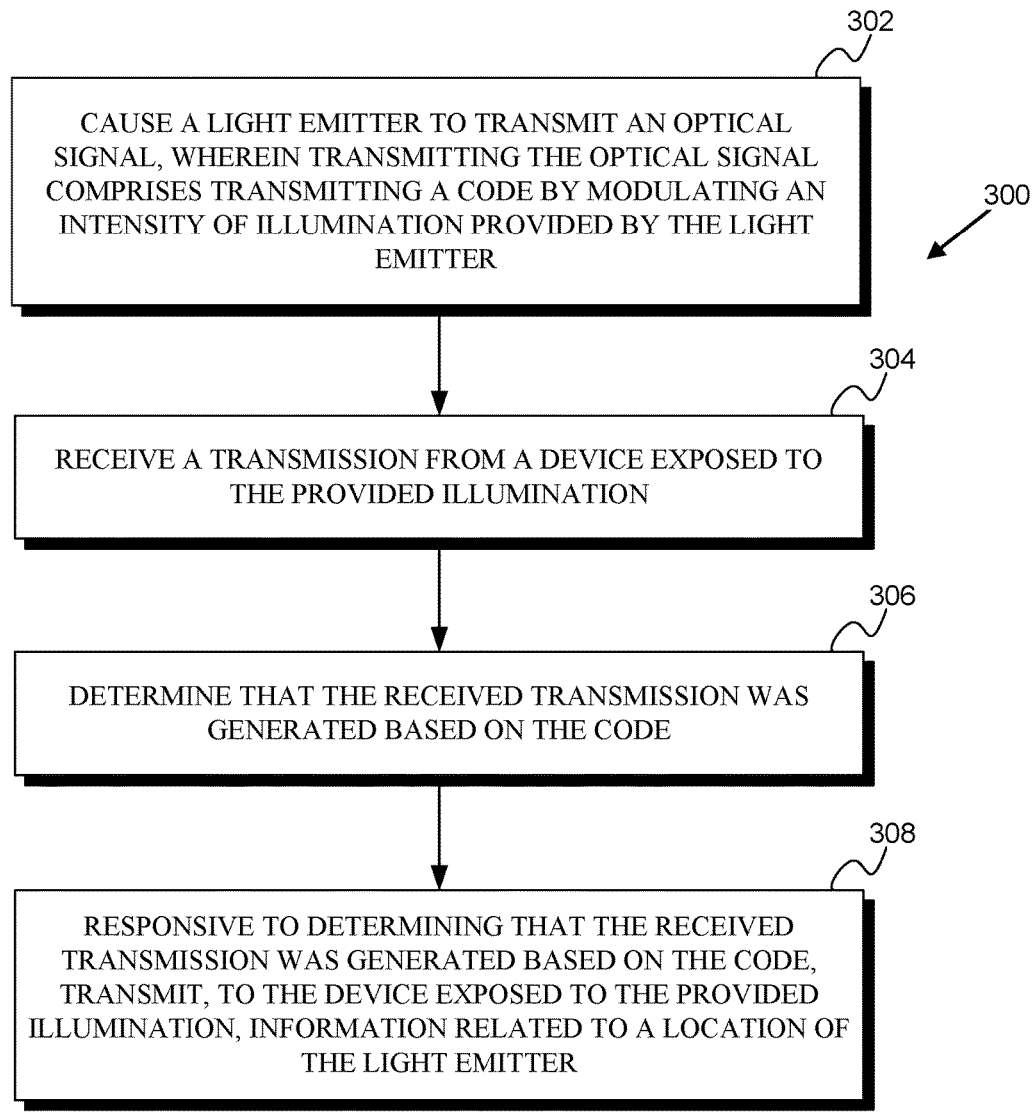
FIG. 3 is a flowchart of an example process.

FIG. 3 is a flowchart of a method 300 for operating a light emitter to optically transmit codes and performing other operations as described elsewhere herein. The method 300 includes causing a light emitter to transmit an optical signal, wherein transmitting the optical signal comprises transmitting a code by modulating an intensity of illumination provided by the light emitter (302). This could include modulating the intensity according to amplitude modulation between two or more discrete intensity levels (e.g., between providing illumination at a specified intensity and provided substantially no illumination) or controlling the intensity of the illumination across a continuous range of intensity levels. Modulating an intensity of illumination provided by the light emitter (302) could include modulating a width, timing, frequency, presence, or some other properties of a plurality of pulses of illumination. Modulating an intensity of illumination provided by the light emitter (302) could include modulating the intensity at a sufficiently high frequency (e.g., greater than 60 Hertz) such that the light emitter can be used to provide, to a room or other environment, illumination that appears to a human to be consistent. The mean intensity of the provided illumination over time could correspond to a specified mean light level (e.g., a light level corresponding to a dimmer switch or other user interface). Codes or other information could be optically transmitted by modulating the intensity according to on-off keying, pulse width modulation, pulse frequency modulation, pulse position modulation, Manchester encoding, or some other modulation scheme or combination of modulation schemes. Information optically transmitted using the light emitter could include checksums, run-length encoding, or other patterns to facilitate accurate reception by a device exposed to the illumination.

The method 300 further includes receiving a transmission from a device exposed to the provided illumination (304). This could include operating a wired or wireless transceiver to receive one or more Ethernet packets, WiFi signals, Bluetooth signals, cellular data signals, optical signals, acoustical signals, or some other signals from a device. The transmission could be received by operating a transceiver or other system to receive signals transmitted from such a device directly; additionally or alternatively, receiving a transmission from a device exposed to the provided illumination (304) could include receiving transmissions from the device via a router, the internet, a signal repeater, or some other intervening system(s).

The method 300 yet further includes determining that the received transmission was generated based on the code (306). This could include determining whether the transmission includes the code, determining whether the transmission includes information encrypted using the code, determining that a request for a resource indicated by the code is present in the transmission, or performing some other determination based on the received transmission. Additionally or alternatively, the timing of the received transmission (e.g., within a specified duration after optically transmitting the code) and/or the fact that a transmission was received at all (e.g., in situations wherein it is rare that transmissions are received from devices that are not exposed to the provided illumination) could be used to determine that a transmission was generated based on an optically-transmitted code.

The method 300 further includes, responsive to determining that the received transmission was generated based on the code, transmitting, to the device exposed to the provided illumination, information related to a location of the light emitter (308). Information related to the location of a light emitter could include an indication of the location of the light emitter, information about devices or systems that are located proximate to the light emitter, information about the environment of the light emitter, files or other resources that have been associated with the location of the light emitter (e.g., via metadata or file permissions), images or other information related to a presentation or other audiovisual event being presented proximate the light emitter, an advertisement that has been associated with the location of the light emitter (e.g., an advertisement being presented on a display that is proximate to and/or that comprises the light emitter), or some other information related to the location of the light emitter.

Information related to the location of a light emitter could include information related to servers, audiovisual equipment (e.g., displays), teleconferencing equipment, climate controls, or other systems that operate in proximity to or otherwise affect the environment of the light emitter. Such information could include images, slides, supplemental information, biographical information, hyperlinks, links to audio or video recordings of a presentation or teleconference, or other information related to a presentation, videoconference, advertisement, or other information being presented proximate to the light emitter. Information related to systems that operate in proximity to or otherwise affect the environment of the light emitter could include information indicative of services or capabilities of such systems and/or commands that could be used to control or otherwise affect the operation of such systems. This information could include descriptions of commands, APIs, control protocols, operational states and/or control protocol states, user-readable software-defined control panels or user interfaces, or other information about controlling or otherwise affecting the operation of such systems and/or retrieving information about the ongoing operations or status of such systems.

The method 300 could include additional or alternative steps. The method 300 could include transmitting information that is not related to the location of the light emitter. The method 300 could include transmitting information to the device from which a transmission was received or performing some other operations responsive to receiving such a transmission without determining that the transmitting device is exposed to the illumination and/or without determining that the transmission from the device was generated based on an optically-transmitted code. The transmission received from the device could include an indication of a command. In such an example, the method 300 could further include operating according to such a command and/or transmitting instructions to a system (e.g., a climate control system) to operate according to the command. The method 300 could include operating the light emitter to optically transmit further codes and/or to engage in further communications with a device related to such further codes. The method 300 could include operating further light emitters to optically transmit the same or different codes and to interact with devices that are exposed to illumination from such further light sources. The method 300 could include operating one or more displays (e.g., to provide one or more images), speakers, microphones, cameras, or other equipment, e.g., to facilitate a presentation, videoconference, or other applications. The method 300 could include further steps, or steps alternative to those listed here.

Figure 4:
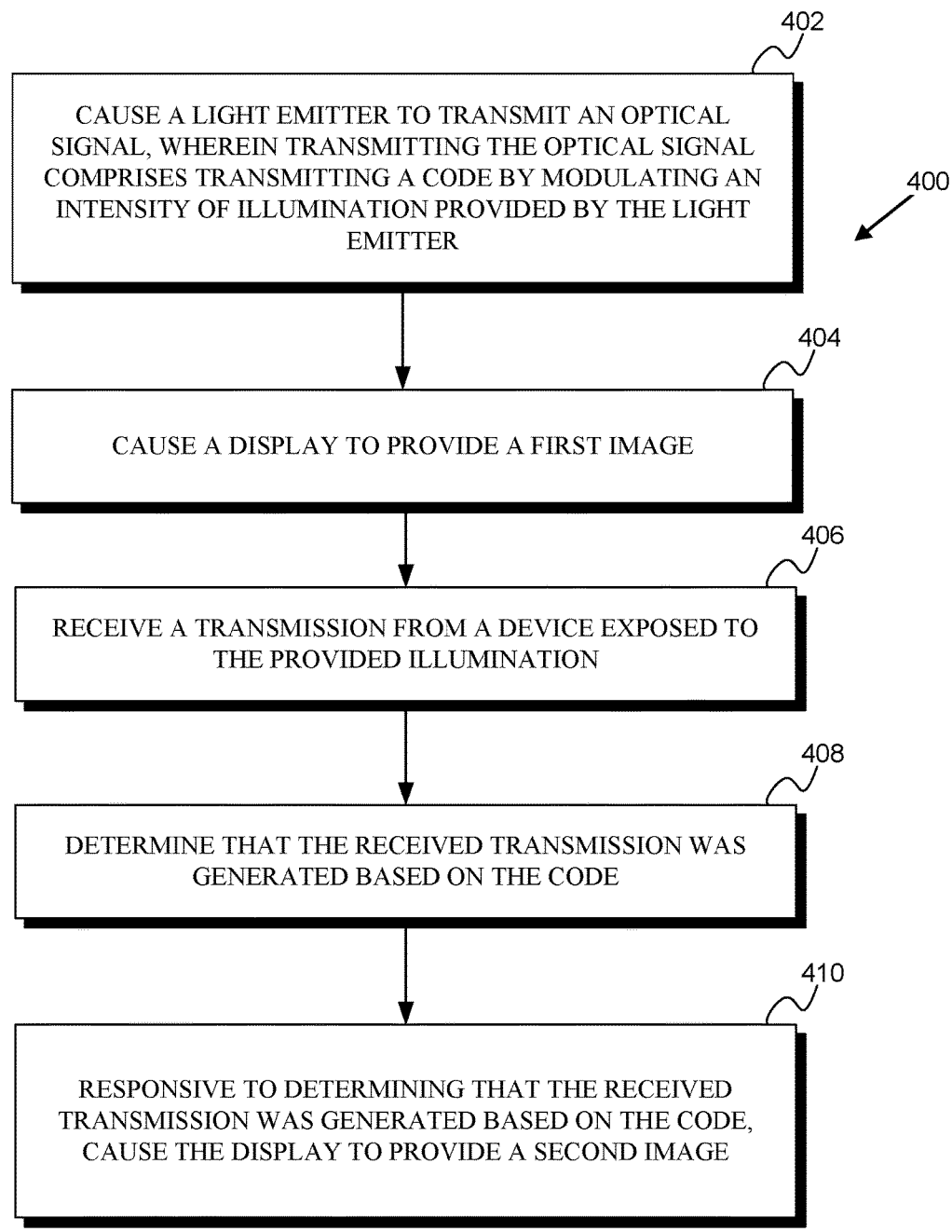
FIG. 4 is a flowchart of an example process.

FIG. 4 is a flowchart of a method 400 for operating a light emitter to optically transmit codes and performing other operations as described elsewhere herein. The method 400 includes causing a light emitter to transmit an optical signal, wherein transmitting the optical signal comprises transmitting a code by modulating an intensity of illumination provided by the light emitter (402). This could include performing operations described in connection with step 302 of method 300 above, or performing some other operations and/or operating devices or systems as described herein.

The method 400 further includes causing a display to provide a first image (404). This could include operating the display to generate the image, e.g., via a display bus or some other interconnect. Additionally or alternatively, causing the display to provide the first image (404) could include transmitting, to the display, one or more commands or other information to cause the display to provide the first image. This could include transmitting information indicative of a raster image, a vector image, a slide from a presentation, text, an identifier selecting the image from a set of images available to the display (e.g., an filename of a presentation file and a number of a slide within the presentation file, an identifying name or number of an advertisement image from a set of advertisement images), or some other information indicative of the first image. In some examples, the light emitter and display could include elements in common. For example, an overall intensity of light provided by the display in order to provide the first image could be modulated to optically transmit the code.

The method 400 further includes receiving a transmission from a device exposed to the provided illumination (406). This could include performing operations described in connection with step 304 of method 300 above, or performing some other operations and/or operating devices or systems as described herein.

The method 400 yet further includes determining that the received transmission was generated based on the code (408). This could include performing operations described in connection with step 306 of method 300 above, or performing some other operations and/or operating devices or systems as described herein.

The method 400 further includes, responsive to determining that the received transmission was generated based on the code, causing the display to provide a second image (410). This could include operating the display to generate the image, e.g., via a display bus or some other interconnect. Additionally or alternatively, causing the display to provide the second image (410) could include transmitting to the display one or more commands or other information to cause the display to provide the second image. Such commands could include information indicative of modifications of the first image that could be performed to generate the second image. The second image could be generated based on information indicated in the transmission received from the device, e.g., based on user preferences indicated in the transmission.

The method 400 could include additional or alternative steps. The method 400 could additionally include transmitting information to the device, e.g., transmitting information related to the light emitter and/or an indication of one or both of the first or second images. The method 400 could include transmitting information to the device from which a transmission was received or performing some other operations responsive to receiving such a transmission without determining that the transmitting device is exposed to the illumination and/or without determining that the transmission from the device was generated based on an optically-transmitted code. The transmission received from the device could include an indication of a command (e.g., of a command indicated to the device via optically transmitted code(s)) and the method 400 could further include operating according to such a command. The method 400 could include operating the light emitter to optically transmit further codes and/or to engage in further communications with a device related to such further codes. The method 400 could include operating further light emitters to optically transmit the same or different codes and to interact with devices that are exposed to illumination from such further light sources. The method 400 could include further steps, or steps alternative to those listed here.

Figure 5:
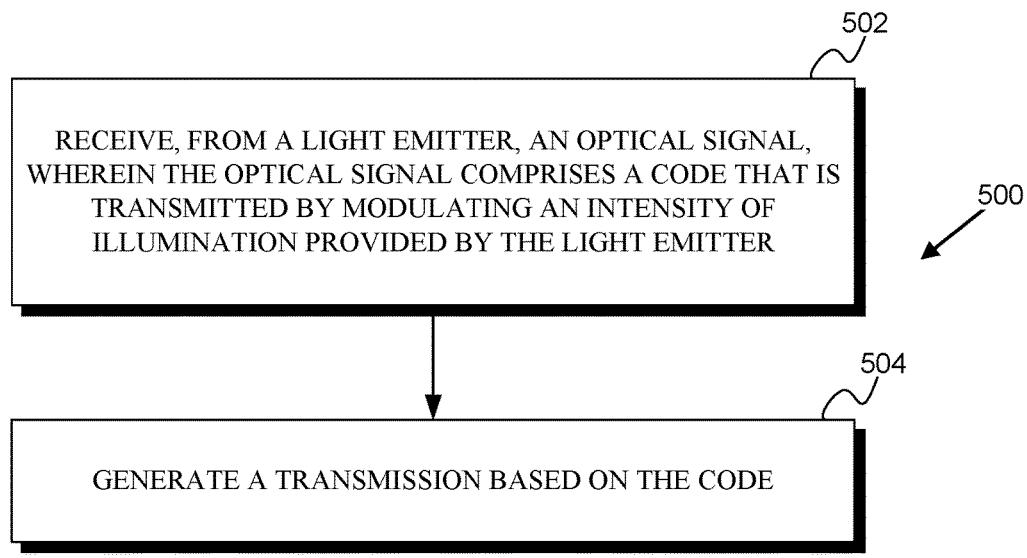
FIG. 5 is a flowchart of an example process.

FIG. 5 is a flowchart of a method 500 for operating a device to receive codes, optically transmitted via illumination to which the device is exposed, and perform other operations as described elsewhere herein. The method 500 includes receiving, from a light emitter, an optical signal, wherein the optical signal comprises a code that is transmitted by modulating an intensity of illumination provided by the light emitter (502). This could include operating a camera, photodiode, or other light-sensitive components to detect the intensity of light at a plurality of points in time. Receiving the optical signal (502) could include operating circuitry and/or executing instructions to demodulate the time-varying intensity of the received light or to perform some other operations to recover the code and/or other information from the optical signal. Receiving the optical signal (502) could include operating multiple light-sensitive components in order to improve the reception of optical signals (e.g., to reduce a bit error rate of transmission or to decrease the likelihood that no light-sensitive components are exposed to the provided illumination) and/or to determine the direction and/or location of a light emitter that is providing the optical signals.

The method 500 further includes generating a transmission based on the code (504). This could include generating a transmission that includes the code and/or some additional information, generating a transmission in response to receiving the code, generating a transmission that is encrypted according to the code, transmitting one or more commands indicated by the code, or generating a transmission in some other way based on the received code. Generating a transmission (504) could include generating a wired or wireless transmission (e.g., one or more Ethernet packets, a WiFi signal, a Bluetooth signal, a cellular data signal, an acoustical signal, an optical signal).

The method 500 could include additional or alternative steps. The method 500 could include, responsive to receiving the code, presenting a user interface (e.g., on a touchscreen) based on commands or other information (e.g., a user interface configuration) indicated by the code. In such an example, generating a transmission based on the code (504) could include generating a transmission, indicative of a command selected by a user, in response to the user inputting such a selection. Generating a transmission based on the code (504) could include indicating a set of preferences or other information (e.g., default settings, presentation files, music files, or other information or preferences related to the operation of a teleconferencing or otherwise configured system). The method 500 could include further steps, or steps alternative to those listed here The methods 300, 400, 500 described herein could be performed by a processor or other computational device executing instructions stored in a non-transitory computer readable medium. The instructions stored in the non-transitory computer readable medium could include instructions that, when executed by a processor or other computational device, could result in the performance of all or part of any of the methods or other operations described herein. The non-transitory computer readable medium containing the instructions could be part of a system that includes the computing device executing the instructions (e.g., a hard disk, solid state memory, RAM, ROM or other computer-readable memory storage of a computer, server, tablet, building automation controller, cell phone, or other device or system) or could be part of a system in communication with such a system (e.g., a cloud storage service, a network attached storage appliance, an app store accessible through the internet).

V. Conclusion

The particular arrangements shown in the figures should not be viewed as limiting. It should be understood that other embodiments may include more or less of each element shown in a given figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method comprising:
    causing a light emitter to transmit an optical signal, wherein transmitting the optical signal comprises transmitting a code by modulating an intensity of illumination provided by the light emitter;
    receiving a wireless transmission from a device exposed to the provided illumination;
    determining that the received wireless transmission was generated based on the code; and
    responsive to determining that the received transmission was generated based on the code, transmitting, to the device exposed to the provided illumination, information related to a location of the light emitter.

2. The method of claim 1, wherein the received wireless transmission being generated based on the code comprises the wireless transmission being generated in response to reception of the code.

3. The method of claim 1, wherein determining that the received wireless transmission was generated based on the code comprises determining that the received wireless transmission comprises the code.

4. The method of claim 1, wherein the code comprises an indication of a resource, and wherein determining that the received wireless transmission was generated based on the code comprises determining that the received wireless transmission comprises a request for the indicated resource.

5. The method of claim 1, further comprising:
    causing a display to provide an image, wherein the display is proximate to the location of the light emitter, wherein transmitting information related to the location of the light emitter to the device exposed to the provided illumination comprises transmitting an indication of the provided image.

6. The method of claim 1, wherein determining that the received wireless transmission was generated based on the code comprises determining that the received wireless transmission comprises information encrypted according to the code.

7. The method of claim 1, wherein transmitting information related to the location of the light emitter comprises transmitting information encrypted according to the code.

8. The method of claim 1, wherein transmitting information related to the location of the light emitter comprises transmitting information indicative of a set of one or more commands, and wherein the method further comprises:
    receiving a further wireless transmission from the device exposed to the provided illumination;
    determining, based on the received further wireless transmission, that the received further wireless transmission comprises an indication of a command from the set of one or more commands; and responsive to determining that the received wireless transmission comprises an indication of a command from the set of one or more commands, performing one or more operations corresponding to the indicated command.

9. The method of claim 8, further comprising:
causing a display to provide a first image, wherein the display is proximate the location of the light emitter, wherein performing one or more operations corresponding to the indicated command comprises causing the display to provide a second image.

10. The method of claim 1, wherein the light emitter comprises a first light emitter, the method further comprising:
causing a second light emitter to transmit a further optical signal, wherein transmitting the further optical signal comprises transmitting a further code by modulating an intensity of illumination provided by the second light emitter;
receiving a further wireless transmission from a further device exposed to the illumination provided by the second light emitter, wherein the further device is not exposed to illumination provided by the first light emitter;
determining that the received further wireless transmission was generated based on the further code; and
responsive to determining that the received further wireless transmission was generated based on the further code, transmitting, to the device exposed to the illumination provided by the second light emitter, information related to a location of the second light emitter.

11. The method of claim 1, further comprising:
causing the light emitter to transmit a further optical signal, wherein transmitting the further optical signal comprises transmitting a further code by modulating the intensity of illumination provided by the light emitter;
receiving a further wireless transmission from the device exposed to the provided illumination;
determining that the received further wireless transmission was generated based on the further code; and
responsive to determining that the received further wireless transmission was generated based on the further code, transmitting, to the device exposed to the provided illumination, further information related to the location of the light emitter.

12. A system comprising:
a transceiver; and
a controller that is operably coupled to the transceiver, wherein the controller comprises a computing device programmed to:
cause a light emitter to transmit an optical signal, wherein transmitting the optical signal comprises transmitting a code by modulating an intensity of illumination provided by the light emitter;
receive, using the transceiver, a wireless transmission from a device exposed to the provided illumination;
determine that the received wireless transmission was generated based on the code; and
responsive to determining that the received wireless transmission was generated based on the code, transmit, using the transceiver, information related to the location of the light emitter to the device exposed to the provided information.

13. The system of claim 12, wherein determining that the received wireless transmission was generated based on the code comprises determining that the received wireless transmission comprises the code.

14. The system of claim 12, wherein determining that the received wireless transmission was generated based on the code comprises determining that the received wireless transmission comprises information encrypted according to the code.

15. The system of claim 12, wherein transmitting information related to the location of the light emitter comprises transmitting information encrypted according to the code.

16. The system of claim 12, wherein transmitting information related to the location of the light emitter comprises transmitting information indicative of a set of one or more commands, and wherein the computing device of the controller is further programmed to:
receive a further wireless transmission from the device exposed to the provided illumination;
determine, based on the received further wireless transmission, that the received further wireless transmission comprises an indication of a command from the set of one or more commands; and
responsive to determining that the received further wireless transmission comprises an indication of a command from the set of one or more commands, perform one or more operations corresponding to the indicated command.

17. The system of claim 16, further comprising:
a display, wherein the display is proximate the location of the light emitter, wherein the computing device of the controller is further programmed to cause the display to provide a first image, wherein performing one or more operations corresponding to the indicated command comprises causing the display to provide a second image.

18. The system of claim 12, wherein causing the light emitter to transmit an optical signal comprises transmitting, using the transceiver, a command to the light emitter.

19. A method comprising:
causing a light emitter to transmit an optical signal, wherein transmitting the optical signal comprises transmitting a code by modulating an intensity of the illumination provided from the light emitter;
causing a display to provide a first image;
receiving a wireless transmission from a device exposed to the provided illumination;
determining that the received wireless transmission was generated based on the code; and
responsive to determining that the received wireless transmission was generated based on the code, causing the display to provide a second image.

20. The method of claim 19, wherein the display comprises the light emitter.

* * * * *